United States Patent [19]
McCrossan

[11] Patent Number: 5,148,757
[45] Date of Patent: Sep. 22, 1992

[54] SOIL REMEDIATION METHOD AND APPARATUS

[76] Inventor: Charles McCrossan, Box 1240, 7865 Jefferson Hwy., Maple Grove, Minn. 55369

[21] Appl. No.: 773,246

[22] Filed: Oct. 9, 1991

Related U.S. Application Data

[62] Division of Ser. No. 644,335, Jan. 23, 1991, Pat. No. 5,086,717.

[51] Int. Cl.$^5$ .............................. F23J 3/00
[52] U.S. Cl. .................... 110/216; 110/215; 110/346; 110/106; 47/1.42
[58] Field of Search ............ 110/346, 223–228, 110/215, 216; 432/13, 139

[56] References Cited

U.S. PATENT DOCUMENTS

| | | | |
|---|---|---|---|
| 2,259,967 | 10/1941 | Vogel-Jorgensen | 110/106 |
| 4,201,370 | 5/1980 | Evans et al. | 266/44 |
| 4,571,175 | 2/1986 | Begle et al. | 110/215 |
| 4,738,206 | 4/1988 | Noland | 110/346 |
| 4,782,625 | 11/1988 | Gerken et al. | 47/1.42 |
| 4,873,789 | 10/1989 | Plattner | 47/1.42 |
| 4,949,652 | 8/1990 | Hadley | 110/215 |
| 4,951,417 | 4/1990 | Gerken et al. | 47/1.2 |
| 4,966,086 | 10/1990 | Houston | 110/215 |
| 5,018,457 | 5/1991 | Brady et al. | 110/346 |
| 5,022,330 | 6/1991 | Bargher et al. | 110/216 |

Primary Examiner—Henry C. Yuen
Attorney, Agent, or Firm—Gregory P. Kaihoi; David C. West

[57] ABSTRACT

The invention provides an apparatus for removing VOC's from soil, particularly soil contaminated with gasoline, diesel fuel, or the like. The apparatus includes a burner-heated drum for substantially vaporizing the VOC's (the drum desirably is of the type used in hot mix asphalt plants, to which the apparatus of the invention is particularly suited to be adapted). The vaporized VOC's are then ducted to an air scrubber where the VOC's are substantially entirely absorbed into the scrubber water, along with any airborne soil particulates. The VOC and particulate-laden water is then conducted to a settling basin where the particulates are allowed to settle out. Particulate-free VOC-laden water is withdrawn from the basin and transported to an air stripper where the VOC's are vaporized. The vaporized VOC's are then conducted to the drum burner, where they are burned to help heat the drum and additional soil that is being processed. The air stripper water, from which the VOC's have been removed, is returned to a clean water reservoir for re-use in the air scrubber. The VOC's act as a partial fuel source for the drum burner, and are disposed of without the need for carbon filtration or expensive afterburners. Water used in the scrubber, settling basin and stripper can be recycled through a clean water reservoir.

11 Claims, 5 Drawing Sheets

SOIL REMEDIATION METHOD AND APPARATUS

This is a divisional of co-pending application Ser. No. 07/644,335, filed Jan. 23, 1991, now U.S. Pat. No. 5,086,717.

TECHNICAL FIELD

The invention relates to a method and apparatus for removing volatile organic compounds (VOC's) from soil.

BACKGROUND OF THE INVENTION

Soil can become contaminated by volatile organic compounds (VOC's) in a variety of ways. Leaking fuel tanks and pipelines, either above ground or underground, frequently contaminate soil with gasoline or diesel fuel. Underground tanks and pipelines can be particularly prone to leaks as they may have been in use for many years and, because they are buried in the soil, a slow leak may go undetected for some period of time. Industrial waste discharge and industrial accidents may also contribute to contamination of soil by VOC's.

Regardless of the source of contaminating VOC's concern for the purity of groundwater and the environment generally has given rise to the need for methods and systems for removing the contaminating VOC's from soil. Thermal stripping of VOC's from soil by heating the soil to some temperature below the combustion temperature of the VOC's has been utilized in a variety of systems, such as those shown in U.S. Pat. Nos. 4,738,206 and 4,782,625. These systems typically are designed to handle relatively low volumes of soil, however, and ultimately depend on relatively expensive techniques of capturing and disposing of the VOC's once they have been isolated from the soil, such as carbon filtration or afterburners. A need therefore exists for an efficient, high volume method and apparatus for removing and disposing of VOC's that contaminate soil.

SUMMARY OF THE INVENTION

The invention provides a method and apparatus for removing VOC's from soil, particularly soil contaminated with gasoline, diesel fuel, or the like. The method includes the steps of heating the soil in a burner-heated drum to substantially vaporize partially combust the VOC's (the drum desirably is of the type used in hot mix asphalt plants, to which the method and apparatus of the invention is particularly suited to be adapted). The vaporized VOC's are then ducted to an air scrubber where the VOC's are substantially entirely absorbed into the scrubber water, along with any captured airborne soil particulates. The VOC and particulate-laden water is then conducted to a settling basin where the particulates are allowed to settle out. The substantially particulate-free VOC-laden water is withdrawn from the basin and transported to an air stripper where the VOC's are vaporized. The vaporized VOC's are then conducted to the drum burner, where they are burned to help heat the drum and additional soil that is being processed. The air stripper water, from which the VOC's have been removed, is returned to a clean water reservoir for re-use in the air scrubber.

BEST MODE FOR CARRYING OUT THE INVENTION

The method and apparatus of the invention can be employed using any suitable components. The invention is particularly suited, however, to be employed in connection with a hot mix asphalt plant adapted in accordance with the invention. Such a plant has the advantage of being easily diverted from asphalt mixing to soil remediation and back again, as desired, based on current needs.

Figure 1:
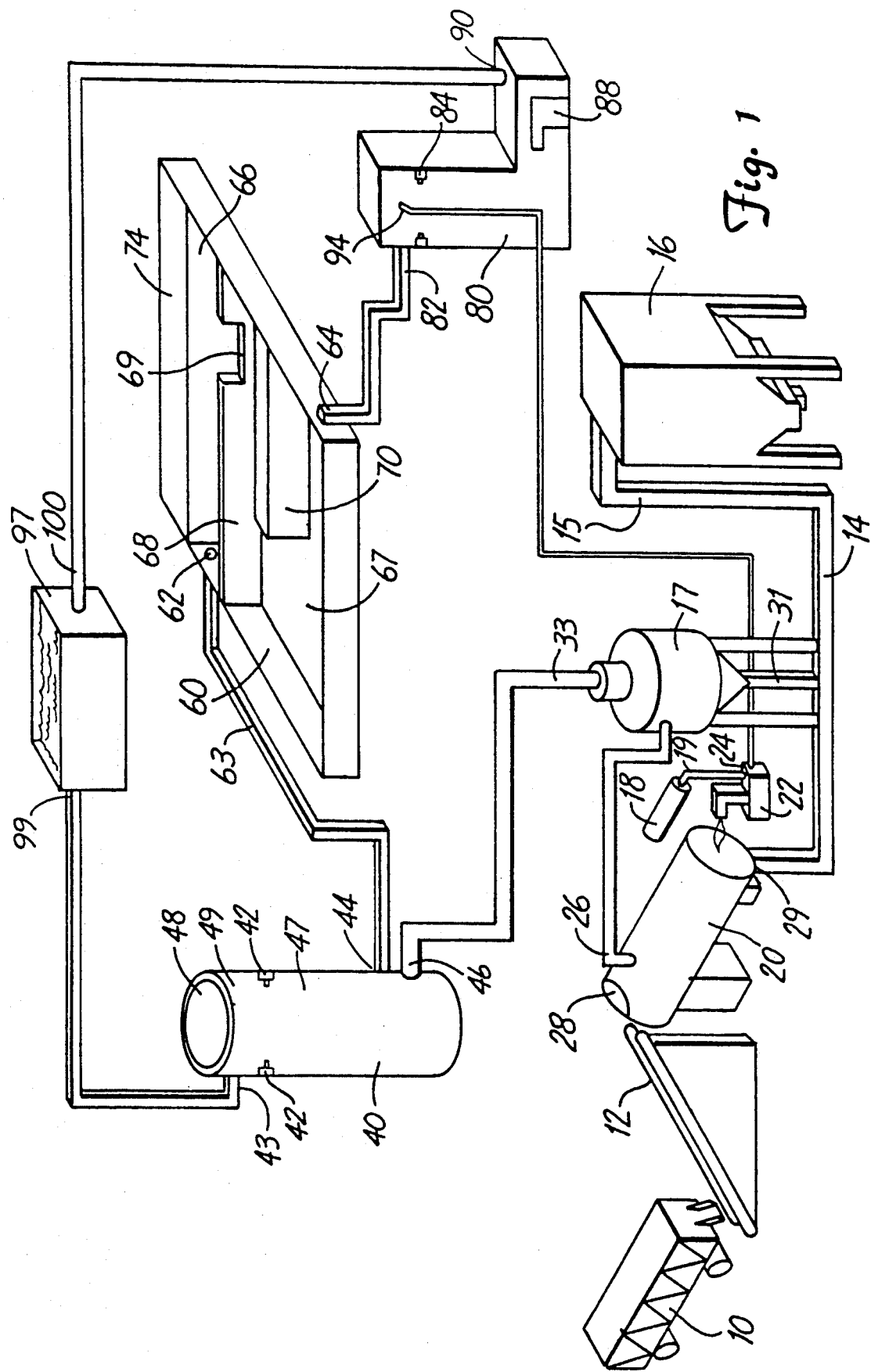
FIG. 1 is a perspective view of the apparatus of the invention.

FIG. 1 is a perspective view showing the path of the soil and VOC's and summarizing the process of the invention. As FIG. 1 is a pictorial schematic, the scale and exact locations of the apparatus of the invention are shown for representative convenience only. Engineering needs will dictate the actual size and locations of the apparatus for each installation. After contaminated soil is excavated from the ground and prepared for processing, it can be placed in a holder 10 and transported by a conveyor 12 or similar means into the chamber of a burner heated drum 20 (such as is typically used in a hot mix asphalt plant). Located at opposite ends of the drum 20 are soil intake 28 and outlet gates 29. For continuous processing (rather than batch processing), the end of the drum 20 containing the intake gate 28 is typically elevated at an acute angle of between 4° and 10°. The chamber is internally heated by a combustion flame burner 22 fueled by a main fuel tank 18 and the entire drum is rotated about its longitudinal axis to mix and turn the soil. The rotating motion of the elevated drum causes the soil to slowly descend the length of the chamber as it is tumbled and mixed.

As the soil travels through the chamber, the burner flame heats the soil to a temperature which is hotter than the vaporization temperature of most of the VOC's but not hot enough to spontaneously oxidize or burn them, except those in the area immediately adjacent to the burner flame. Most of the VOC's therefore vaporize in the drum. The vaporized VOC's, along with some airborne soil particulates, are drawn off into the process air exhaust vent 26. When the soil reaches the end of the chamber, it is substantially free of VOC's and exits through the outlet gate 29. From there, the soil may be handled in any desired fashion. In a preferred embodiment utilizing an adapted hot mix asphalt plant, the soil travels through a conduit 14 to an elevator 15. The elevator transports the soil into a large pug mill 16 or similar apparatus where normally oil would be added to the heated soil to make asphalt—instead, however, preferably the soil is misted with water at this stage to substantially reduce or eliminate dust (without adding such water, the soil is very dry and therefore very dusty). Following this step, the soil may be utilized in any conventional manner.

The VOC's and particulates which have been removed from the soil travel through the vent 26 to a cyclone separator 17. Inside the cyclone separator, larger soil particles are separated out by gravity, and transported through vent 31 to conduit 14 leading to the elevator 15. The VOC's and remaining soil particulates travel through a pipe 33 to an air scrubber 40. The VOC and airborne particulate mixture enter the air scrubber 40 through an intake 46, typically near the base of the scrubber, while clean water is misted by jets 42 through the vaporized VOC and particulate mixture. The misting both cools and at least partially condenses the VOC's, and causes the VOC's to be absorbed into the scrubber water. Airborne particulates are also trapped by the water mist. The VOC and particulate-laden scrubber water then exits the air scrubber through an outlet 44 while the now substantially clean process air is exhausted out to the atmosphere through outlet 48.

The VOC and particulate-laden scrubber water is conducted through a conduit 63 to a settling basin 60. The water enters the basin 60 through an inlet 62. Once inside the settling basin, the particulates are allowed to settle out from the scrubber water. Weir walls 68 may be employed, using conventional decanting methods, to assure virtually complete removal of the particulates. The scrubber water, which now contains only VOC's, is removed from the basin 60 through an outlet 64 and conducted through a conduit to an air stripper 80.

The VOC-laden water enters the air stripper through an inlet 82. A blower 88 flushes ambient air through the length of the stripper. Inside the air stripper, the VOC-laden water travels in one direction (typically downwardly), while the air flow travels in a countercurrent manner (typically upward). The air effectively strips the VOC's from the water. The now cleansed water collects in a clear well, exits the air stripper through an outlet 90 and is returned to a clean water reservoir 97 for re-use in the air scrubber 40. The VOC's exit the air stripper through a duct 94 which carries them to the burner 22 that heats the rotating drum 20 where the VOC's are burned.

Figure 2:
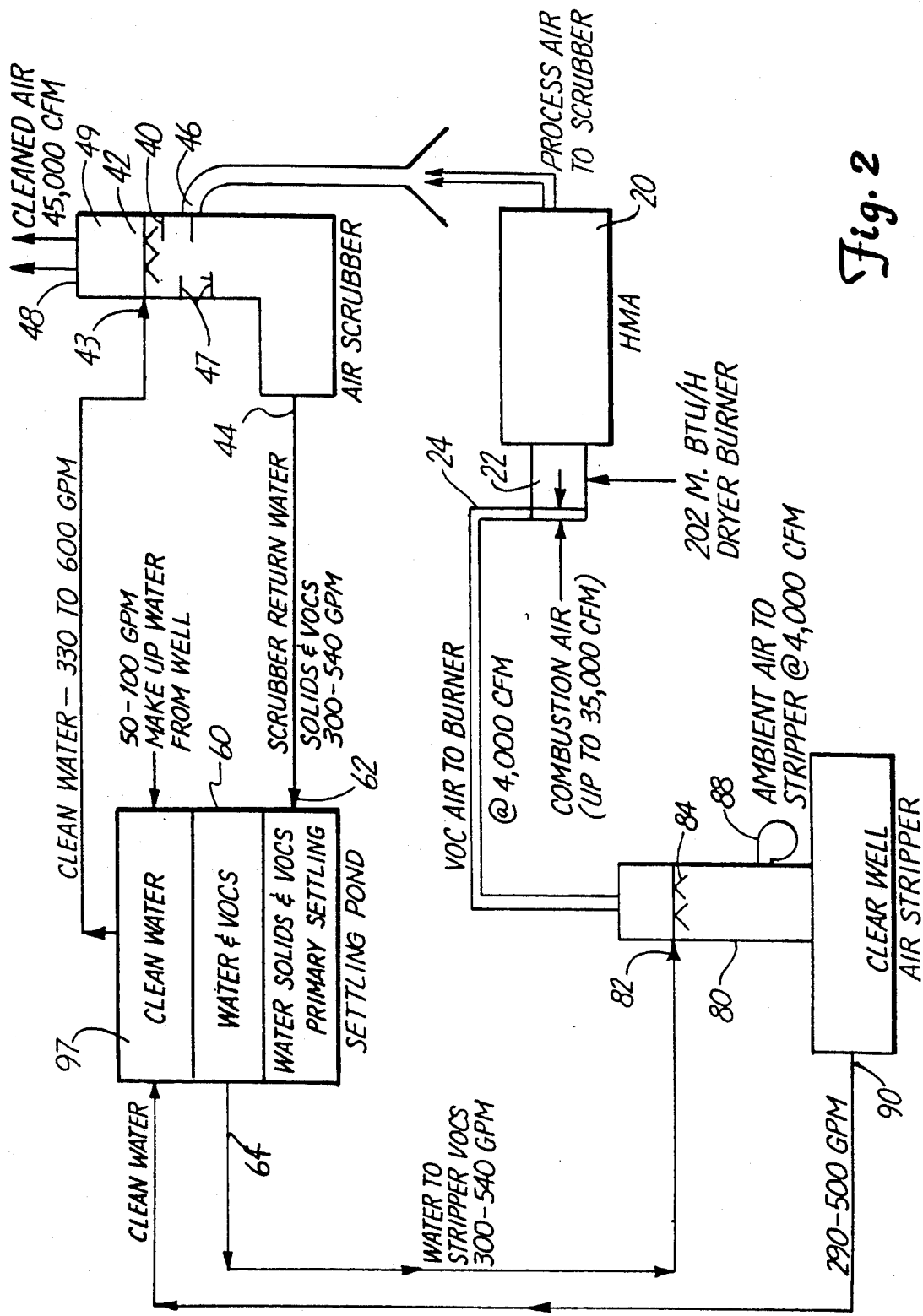
FIG. 2 is a schematic flow diagram of the apparatus and method of the invention.
Figure 3:
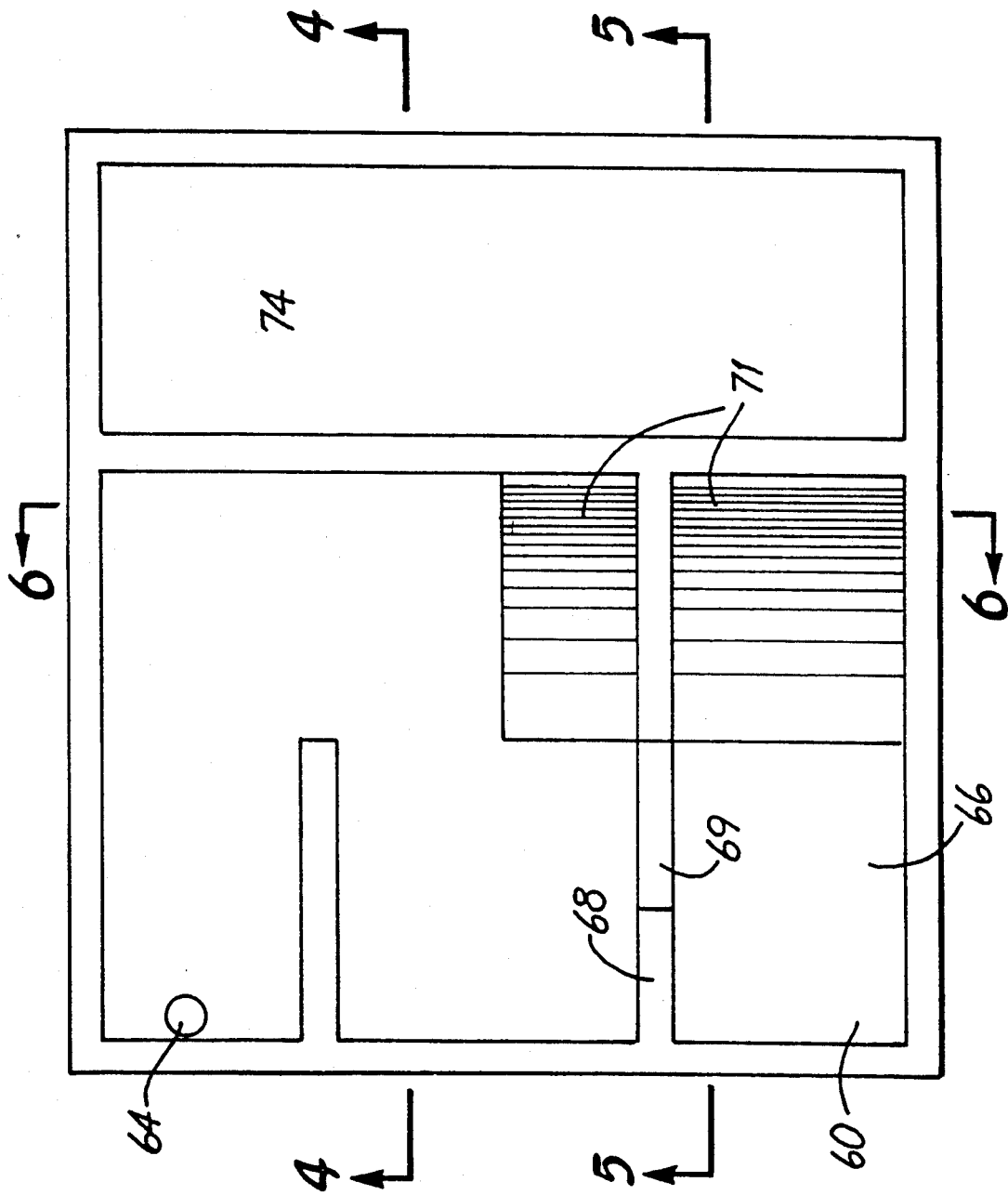
FIG. 3 is a plan view of a settling basin and soil storage apron in accordance with the invention.
Figure 4:
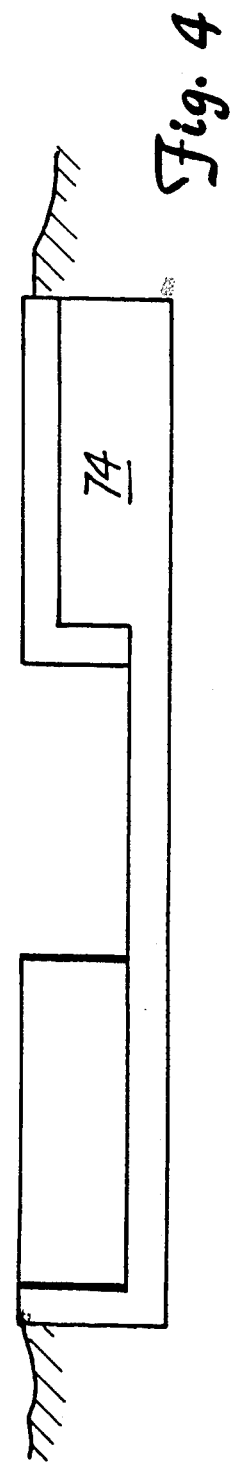
FIG. 4 is a side cross-sectional view of the settling basin and apron taken along line 4—4 of FIG. 3.
Figure 5:
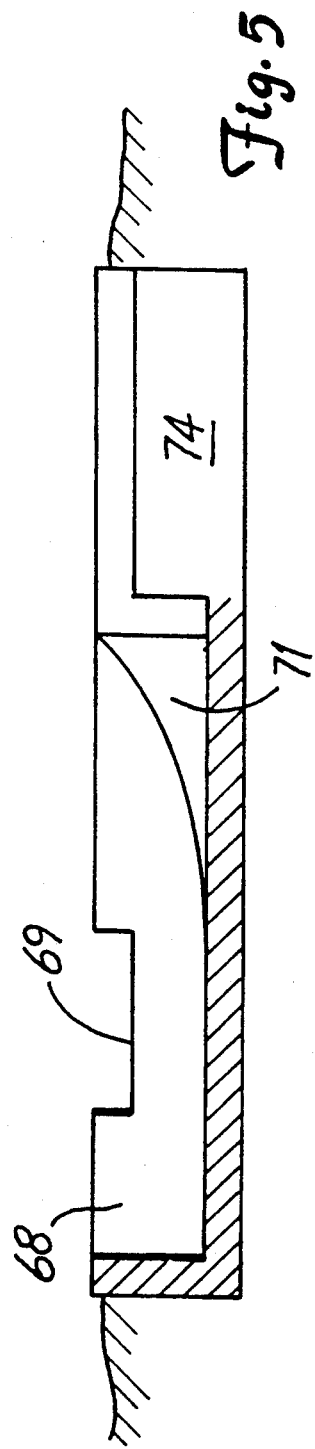
FIG. 5 is a side cross-sectional view of the settling basin and apron taken along line 5—5 of FIG. 3.
Figure 6:
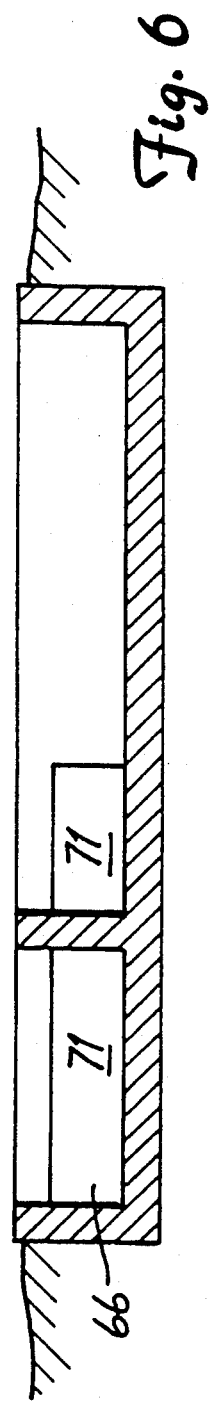
FIG. 6 is a side cross-sectional view of the settling basin taken along 6—6 of FIG. 3.
Figure 7:
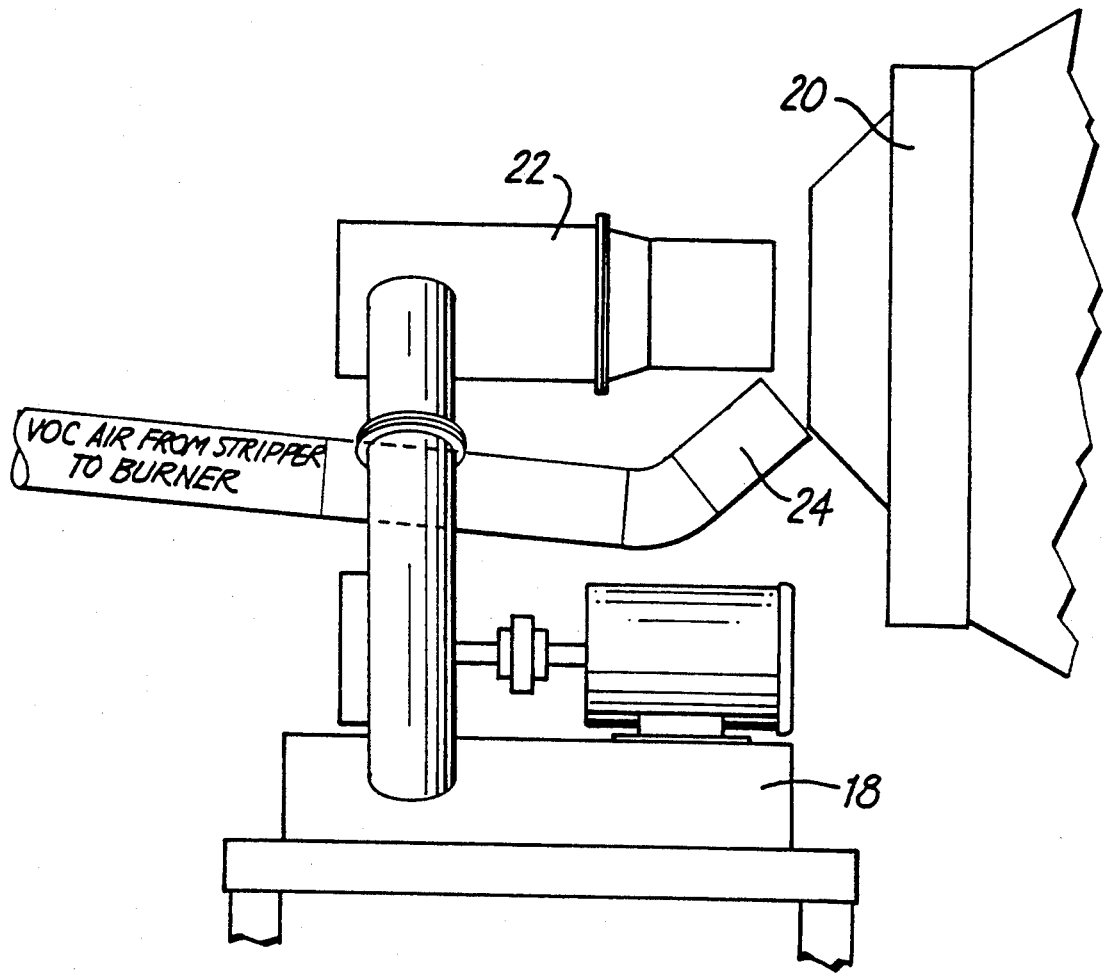
FIG. 7 is a top view of the burner and the conduits feeding the burner.

The schematic of FIG. 2 gives representative examples of volumes of water and air conducted from one component of the system into the next. As can be seen from comparison of the air moving through the air scrubber 40 and the air stripper 80, the VOC's have been effectively concentrated into a much smaller volume of air. This volume is correspondingly only a fraction of the volume of the combustion air utilized in the drum burner 22, permitting efficient combustion of the VOC's. FIG. 7 shows in greater detail the burner and the ducts feeding it and the drum.

By burning the VOC's in the drum burner 22 the method of the invention dispenses with the need for expensive, fuel consuming afterburners or equally expensive and massive charcoal filters utilized on systems capable of handling only much smaller volumes of VOC's than the present invention. In addition to these benefits, combustion of the VOC's in the drum burner 22 actually reduces the fuel needed to power the burner, in direct proportion to the amount of VOC's isolated from the soil.

FIG. 2 illustrates the two virtually closed loops of the system. VOC's are removed from the soil in the drum 20, absorbed by water in the air scrubber 40, removed from the water in the air stripper, and burned in the drum burner 22. Clean water, stored in a reservoir 97, is used to capture VOC's and particulates in the air scrubber 40; particulates are removed from the water in the settling basin 60, and VOC's are removed from the water in the air stripper 80. The purified water is then returned to the clean water reservoir 97 for re-use in the air scrubber. Makeup water can be added to the reservoir as needed to accommodate evaporation, the only significant source of water loss.

Most of the components of the system are commercially readily available and may be fabricated from conventional materials. As stated above, the rotating drum is preferably of the type used in conventional hot mix asphalt plants, being generally cylindrical with an intake gate at one end and at outlet gate at the other. The end of the drum containing the intake gate is elevated higher than the end of the drum containing the outlet gate. In this way, the soil that enters the drum through the intake gate travels through the drum's longitudinal length and arrives at the outlet gate by means of gravity. As the drum is rotated, the inside of the drum is heated by injecting ignited fuel into the interior of the drum by the use of a burner.

The air scrubber 40 includes an intake for the VOC and particulate mixture 46, an inlet for the water 43, an outlet for the VOC and particulate scrubber water mixture 44, and an exhaust valve for the clean air 48. The mechanics of air scrubbers are familiar to the industry, and many types are known and available for commercial use. In the preferred embodiment, an air scrubber of a kinetic/absorptive type is recommended.

The air scrubber consists primarily of a vertical stack 49. The VOC's and airborne particulates enter through an intake 46 typically located at the base of the stack 49. Simultaneously, misted water enters the air scrubber typically through means of jets 42 desirably placed at the top of the scrubber and/or at other desired locations. The interior walls of the vertical stack 49 of the scrubber 40 are preferably lined with baffles 47. The baffles are desirably attached in an alternating pattern and project in generally a parallel fashion inwardly from the interior wall toward the center of the stack 49. The baffles 47 lengthen the path that the VOC and particulate laden air has to follow and causes the air to flow in a serpentine fashion which encourages more interaction with the misted water. When the VOC's and particulates encounter the misted water, they are substantially trapped, condensed and/or absorbed into the scrubber water. The scrubber water, now laden with VOC's and particulates, exits the air scrubber and is ducted through a conduit to a settling basin 60.

The settling basin 60, as illustrated in FIGS. 3-6, desirably consists of a lined or contained pond having one or more weir walls 68 and baffles 70. The primary settling section 66 of the basin 60 desirably has a sloped floor 71 to facilitate removal of accumulated particulates with conventional equipment. Separating the primary settling section 66 from the rest of the basin are one or more weir walls 68. In the weir wall 68 is a notch 69 located in the top half of the wall. The weir wall notch 69 allows the upper most portion of the water, which is substantially free of all particulates, to overflow into the secondary settling section 67. In this section, at least one baffle 70 extends in a generally parallel fashion from the basin walls towards the middle of the basin. The baffles 70 lengthen the path that the water has to travel in order to exit the basin thereby encouraging further settling of any particulates that may remain in the water. The primary settling section 66 may periodically be cleansed of particulates by draining the section and manually removing the accumulated soil. The now particulate free water exits the settling basin through an outlet 64 and is conveyed to an air stripper 80.

The air stripper 80 typically is comprised of an inlet for the VOC laden water 82, misting jets 84, tower packing trays 86, an air blower 88, a clean water discharge 90, a mist eliminator 92 and a duct to convey the VOC's to the burner heating the drum. The water inlet 82 and the air blower 88 reside at opposite ends of the stripper 80. The VOC laden water and the clean air from the blower flow in counter current fashion. When the air and scrubber water interact, the VOC's are vaporized from the scrubber water. The cleansed water collects and returns to the clean water reservoir 97 through a clean water discharge 90.

The VOC's vaporized in the air stripper 80 are ducted through a conduit 94 to the burner 82 that heats the rotating drum 20. The VOC's enter the burner 22 and are consumed by the flame. This system has the advantage, therefore, of disposing of the VOC's in a way that helps to fuel the drum burner. As the VOC air flow from the air stripper is only a fraction of the burner fuel flow rate, large volumes of VOC's can be removed from the soil, treated, and then disposed of in the drum burner without affecting the burner's efficiency. Additionally, the water used in the process is recycled, thereby further adding to the efficiency of the process treatment.

In the preferred embodiment, a sloped apron 74 resides next to the settling basin 60. The contaminated soil is stored on the apron 74 while awaiting remediation. The apron 74 is sloped so that any VOC-laden run off from rain or moisture that may contact the soil will enter the settling basin 60 and not the ground, river or other natural environment.

In operation, soil which has been contaminated with VOC's, such as diesel fuel, is delivered to the apron and spread out to allow excess moisture to evaporate. Dried soil is then placed on conveyors and taken to the drum where it is heated to about 325° F. Although the method and apparatus of this invention can process a range of soil volumes, the figures given below are for a system processing a typical rate of 220 tons of soil per hour. A drum of 10'×40' can be employed for the processing. The VOC's are drawn off from the soil with 40,000 to 50,000 scfm of VOC-laden air recovered and drawn off at a mass rate that is dependant upon the concentration and type of VOC contamination in the soil. The exhaust air is ducted to a cyclone separater to settle out the larger soil particles and then ducted to an air scrubber where the VOC's interact with water. The water condenses and absorbs the VOC's and airborne soil particulates. A typical air scrubber, capable of utilizing 750 gpm of scrubber water, would be employed for the processing resulting in a water flow of approximately 600 gpm. After the VOC's and particulates are absorbed, condensed or captured in the scrubber water, the clean air is exhausted into the atmosphere at an approximate rate of 54,000 cfm. The VOC-laden scrubber water is then ducted to a settling basin. Four tph of soil particulates are typically recovered and 60 gpm of clean water is typically added to the basin from the clean water reservoir.

The VOC-laden water is ducted to an air stripper and enters at one end of the air stripper while air is blown into the air stripper from the other end. The water and air move in countercurrent directions and interact so that the VOC's are removed from the water to the air. The now cleansed water is returned to the reservoir. The VOC air mixture is then ducted to the burner heating the drum. Inside the burner it is consumed while acting as a partial fuel source for the burner. A typical rate of air flow for the VOC's into the burner is 4000 cfm. As the burner operates at a typical rate of 35,000 cfm, the VOC air flow rate is a fraction of the burner rate, and would thereby reduce the consumption of fuel without adversely affecting performance of the burner.

While a preferred embodiment of the present invention has been described, it should be understood that various changes, adaptations and modifications may be made therein without departing from the spirit of the invention and the scope of the appended claims.

What is claimed is:

1. Apparatus for removing volatile organic compounds (VOC's) from soil comprising:
   a soil heating drum having a burner for heating soil in the drum to substantially vaporize VOC's in the soil;
   an air scrubber and means for ducting VOC's vaporized in the drum to the air scrubber, the air scrubber including means for absorbing into the air scrubber water a substantial portion of the vaporized VOC's;
   a settling basin and means for conducting air scrubber water, into which VOC's have been absorbed, to the settling basin;
   an air stripper, and conduit means for transporting water from the settling basin to the air stripper, the air stripper including means for vaporizing VOC's to remove them from the water;
   means for conducting the VOC's vaporized in the air stripper to the burner whereby the VOC's will be burned to help heat the drum; and
   means for returning the air stripper water from which the VOC's have been stripped to the air scrubber for use in absorbing VOC's coming from the drum.

2. The apparatus of claim 1 wherein a clean water reservoir is provided between the air stripper and the air scrubber.

3. The apparatus of claim 1 wherein the air that is ducted to the air scrubber contains airborne particulate soil.

4. The apparatus of claim 1 including means for trapping the soil particulates in the air scrubber water.

5. The apparatus of claim 2 wherein the settling basin includes an outlet and is configured to permit particulates to settle out before water arrives at the outlet.

6. The method of claim 5 wherein the settling basin contains weir walls to enhance settling.

7. The apparatus of claim 2 including means for adding water to the reservoir to make up for water lost in the air scrubber or air stripper.

8. The apparatus of claim 1 wherein the air output of the air stripper is only a fraction of the combustion air capacity of the drum burner.

9. The apparatus of claim 1 wherein the VOC laden water passes in a counter current flow with the air that is stripping the VOC's in the air stripper.

10. The apparatus of claim 1 including a contaminated soil storage apron located adjacent to the settling basin so that if it rains on the soil the runoff goes into the basin.

11. Apparatus for removing volatile organic compounds (VOC's) from soil comprising:

a soil heating drum having a burner for heating soil in the drum to substantially vaporize VOC's in the soil;

an air scrubber and means for ducting VOC's vaporized in the drum and airborne soil particulates to the air scrubber, the air scrubber including means for absorbing a substantial portion of the vaporized VOC's and trapping soil particulates in the scrubber water;

a settling basin, and means for conducting air scrubber water, into which VOC's have been absorbed, to the settling basin, the basin being configured (inlet and outlet) to permit particulates to settle out before water gets to the outlet and containing weir walls to enhance settling;

an air stripper, and conduit means for transporting water from the settling basin to the air stripper, the air stripper including means for vaporizing the VOC's to remove them from the water by passing the VOC-laden water in a countercurrent flow with the air that is stripping the VOC's;

means for conducting the VOC's vaporized in the air stripper, which is only a fraction of the combustion air capacity of the drum turner, to the burner whereby the VOC's will be burned to help heat the drum;

a clean water reservoir between the air stripper and air scrubber and means for returning the air stripper water from which the VOC's have been stripped to the clean water reservoir to be made available for use in the air scrubber, the clean water reservoir including means for adding water to the reservoir to make up for water lost in the air scrubber or air stripper; and a contaminated soil storage apron located adjacent to the settling basin so that if it rains on the soil the runoff goes into the basin.

* * * * *